United States Patent

Griffin

[15] 3,675,622

[45] July 11, 1972

[54] DIP TANK USED IN COATING FABRIC

[72] Inventor: Theodore F. Griffin, Barberton, Ohio

[73] Assignee: The Goodyear Tire & Rubber Company, Akron, Ohio

[22] Filed: Aug. 3, 1970

[21] Appl. No.: 60,481

[52] U.S. Cl. ............................ 118/421, 68/175, 68/195, 134/122
[51] Int. Cl. ........................................................ B05c 3/12
[58] Field of Search .................................. 118/421, 429; 117/113–117; 134/122

[56] References Cited

UNITED STATES PATENTS

| 3,383,906 | 5/1968 | Gillet | 118/421 X |
| 2,255,436 | 9/1941 | Olson | 118/405 X |
| 2,141,382 | 12/1938 | Ferm | 118/421 X |
| 2,328,106 | 8/1943 | Strong | 118/DIG. 3 |

Primary Examiner—Morris Kaplan
Attorney—F. W. Brunner and Harlan E. Hummer

[57] ABSTRACT

A dip tank for holding liquid adhesive used for increasing the adhesion or bond between fabric and rubberized material used in the production of pneumatic tires. A rubber bag is secured adjacent the bottom of the tank and inflated and deflated to control the level of the liquid within the tank. A roller for directing the fabric into dipping relation with liquid in the tank, is disposed in fixed relation within the tank and journalled for rotation in a pair of bearings disposed in sealed relation outside the tank, such that the liquid cannot seep into the bearings and eventually wear them out or destroy them to hamper rotation of the roller.

20 Claims, 2 Drawing Figures

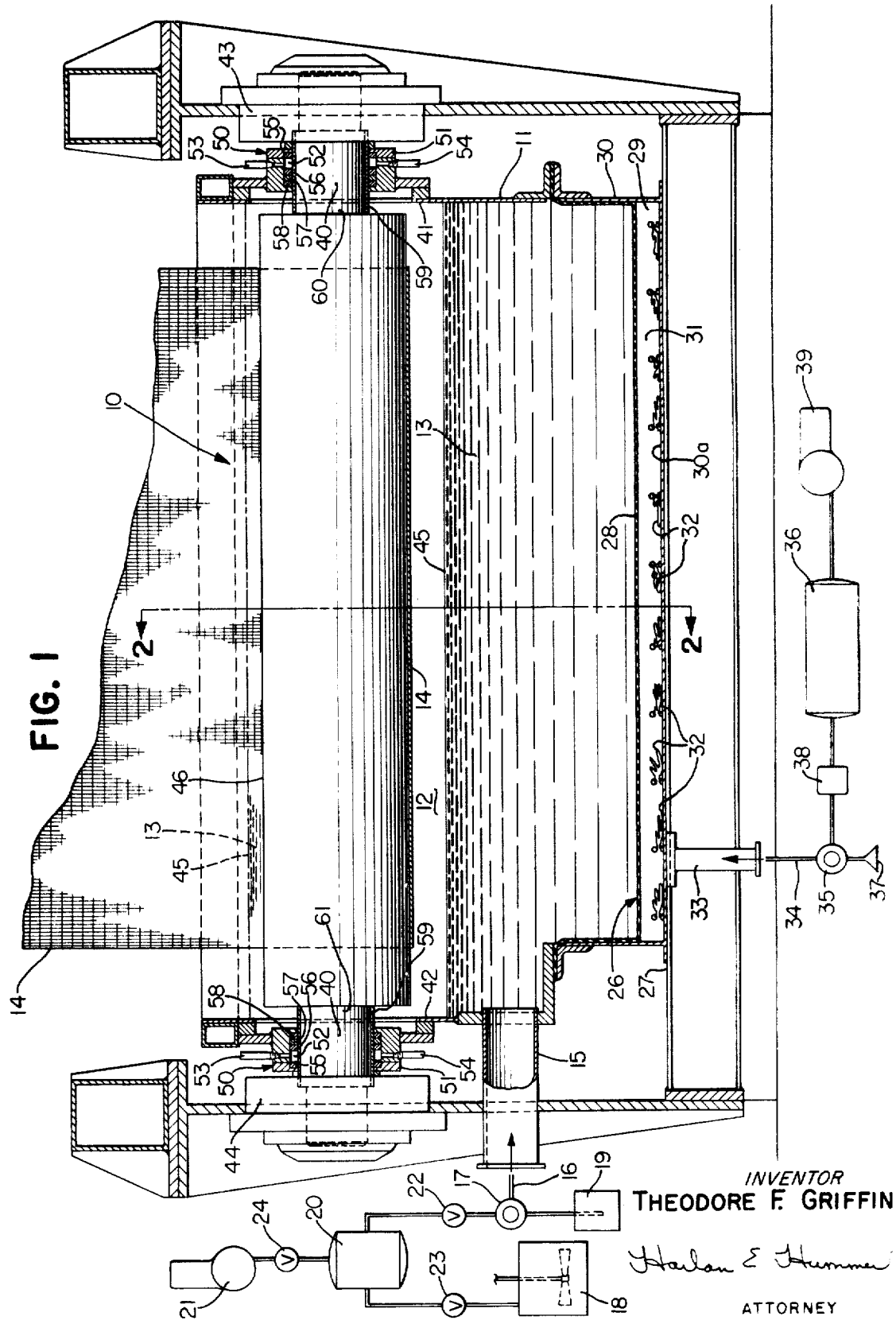

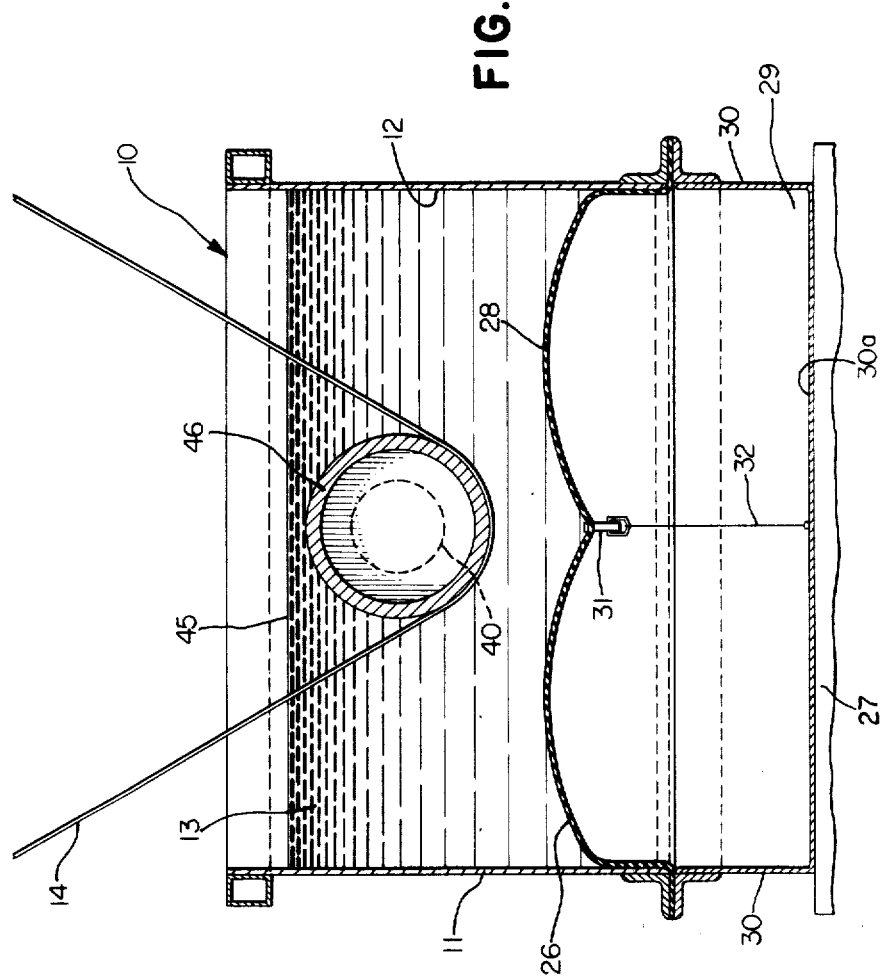

DIP TANK USED IN COATING FABRIC

BACKGROUND OF THE INVENTION

The invention is particularly well suited for use in a process for treating or conditioning fabric having warp tire cords for reinforcing pneumatic tires. Such fabric is generally coated with an adhesive for increasing the bond between the warp cords and rubberized material used in the production of tires. This is normally accomplished by dipping the fabric in liquid adhesive contained in an open tank. These dip tanks usually have a rectangular configuration and are moved into position adjacent a roller, which changes direction of the moving fabric. The tank is raised until the roller is submerged in the liquid, such that the fabric moving over the roller passes through the liquid adhesive. In such devices, however, the bearings in which the roller is journalled for rotation, are also submerged in the liquid adhesive. The seals protecting the bearings from the adhesive, are subject to wear and oftentimes the liquid adhesive seeps into the bearings and destroys them, thereby hampering operation of the roller and movement of the fabric through the dip tank.

The invention is directed to solving this problem by providing an integral roller and tank assembly in which the roller bearings are located outside the tank and consequently do not come in contact with the liquid adhesive. Because of the integral assembly, however, the level of the liquid adhesive must be raised and lowered relative to the roller, since the roller is fixed within the tank, and the tank cannot be removed from the roller.

Briefly stated, the invention is in an integral roller and dip tank assembly comprising a tank for holding liquid. An inflatable bag is secured within the tank, and means are provided for inflating the bag with gas, under pressure, to displace liquid in the tank and, consequently, raise the level of the liquid relative to a roller mounted in the tank for directing fabric into the liquid. The roller is mounted on a shaft which extends through opposing sides of the tank and is journalled for rotation in bearings disposed outside the tank. Means are provided for effecting a seal between the rotating shaft and sides of the tank.

DESCRIPTION OF THE DRAWING

The following description of the invention will be better understood by having reference to the annexed drawing, wherein:

FIG. 1 is a cross-section of the roller and dip tank assembly with the bag in its deflated position; and FIG. 2 is a section viewed from the line 2—2 of FIG. 1 with the bag shown in its inflated position.

DESCRIPTION OF THE INVENTION

Referring to the drawing, there is shown a roller and dip tank assembly, generally indicated at 10. The assembly 10 comprises a dip tank 11 with a chamber 12 for holding any suitable liquid adhesive 13 used for coating tire cord fabric 14 to increase the bond between the fabric 14 and rubberized material used in the production of pneumatic tires. The dip tank 11 has a combination inlet and outlet pipe 15 communicating with the fabric coating chamber 12.

A conduit 16 (schematically shown) is connected to the inlet and outlet pipe 15, and used for carrying liquid adhesive to and from the dip tank 11. A 3-way valve 17 is disposed in the conduit 16 for directing the flow of adhesive between the dip tank 11 and system 18 for mixing adhesive. The 3-way valve 17 is alternately used for diverting waste adhesive into a sump 19. A conventionally designed blowcase 20, including a source 21 of compressed air, is provided for forcing adhesive, under pressure, into the dip tank 11 and for returning unused adhesive to the adhesive mixing system 18. A series of shut-off valves 22, 23, and 24 are provided for regulating the flow of adhesive and compressed air relative to the blowcase 20.

An inflatable bag 26 is preferably disposed adjacent the bottom 27 of the dip tank 11 for varying the level of the liquid adhesive 13 in the fabric coating chamber 12. Generally, the inflatable bag 26 can be composed of any suitable gas impervious, flexible material. In the embodiment shown, however, the inflatable bag 26 comprises a rubber cover or diaphragm 28 clamped in gas sealing relation over a gas impervious fluid compartment 29 with rigid sidewalls 30 and bottom 30a. The fluid compartment 29 is secured to the bottom 27 of the dip tank 11. The rubber cover 28 hugs the sidewalls 30 and bottom 30a of the fluid compartment 29, when it is deflated or in an unexpanded position in closest spaced relation to the bottom 30a of the fluid compartment 29 (FIG. 1). A cross-beam 31 is secured to the rubber cover 28 by any suitable adhesive, or other means not detrimental to the sealing effect of the rubber cover 28. A number of staying wires 32 are secured between the cross-beam 31 and adjacent bottom 30 a of the fluid compartment 29 for keeping the rubber cover 28 from ballooning out, when the bag 26 is inflated with gas, e.g. air under pressure (FIG. 2).

The fluid compartment 29 is provided with a combination air intake and exhaust pipe 33. An air line 34 (schematically shown) is connected to the intake and exhaust pipe 33 for bringing air, under pressure, to the inflatable bag 26. A 3-way valve 35 is disposed in the air line 34 for directing compressed air between a conventionally designed receiver or reservoir 36, for holding air under pressure, and the inflatable bag 26. The 3-way valve 35 alternately diverts used or spent air through a vent 37 into the surrounding atmosphere for deflating the bag 26. A pressure regulator 38 set, for example, at about three-fourths psi, is provided for reducing the pressure of air forced from the receiver 36 into the bag 26. A source 39 of compressed air, such as a factory air system, is provided for supplying air at a pressure, for example, of about 80 psi to the receiver 36. The size of the receiver 36 is dependent on the desired time for inflating the bag 26.

A shaft 40 extends through opposing sidewalls 41 and 42 of the dip tank 11, and is journalled for rotation in a pair of bearings 43 and 44 disposed outside the dip tank 11. The shaft 40 is mounted in parallel relation from the flat bottom 27 of the dip tank 11 and is generally parallel to the exposed surface 45 of the liquid adhesive 13, when the roller and dip tank assembly 10 is in operation for coating the fabric 14. A cylindrical roller 46 is mounted on the shaft 38 for unitary rotation about the longitudinal axis of the shaft. The roller 46 is composed of any suitable material, e.g. stainless steel.

An assembly 50 is provided for effecting a liquid seal between the rotating shaft 40 and each of the opposing sidewalls 41 and 42 of the dip tank 11. The seal assemblies 50, each comprise a housing 51 with a centrally disposed bore or compartment 52, which is in communicating relation with a pair of hoses 53 and 54 for carrying water, under pressure, to and from the compartment 54. A number of annular seals 55, 56, 57, and 58 are provided for sealing off the water compartment 52 by forming a seal between the housing 51 and similar sealing sleeves 59 which surround adjacent opposing ends 60 and 61 of the rotating shaft 40. The water is used for cooling the rotating shaft 40 and maintaining pressure against the seals 55–58 to keep them in sealing relation between the housings 51 and rotating shaft 40. Moreover, the water is utilized for cleaning the seals 56–58 and keeping adhesive from seeping past them into the bearings 43 and 44. The adhesive 13 includes wetting agents, which makes the adhesive wetter than water with a greater tendency for flowing past the water. Therefore, the water is maintained at a pressure greater than the static pressure of the adhesive, such that any migration of liquid, whether adhesive or water, will be in the direction of the coating chamber 12, rather than toward the bearings 43 and 44. The slight amount of water filtering through the seals into the adhesive, will not adversely affect the adhesive.

In operation, the roller and tank assembly 10 is permanently fixed in position for reeving tire cord fabric 14 around the roller 46. Liquid adhesive is blown through the inlet pipe 15, until the coating chamber 12 is partially filled to a level where the surface 45 of the adhesive is just below the roller 46 a distance sufficient to allow movement of tire cord fabric 14 around the roller 46 without touching or becoming immersed in the adhesive 13. The 3-way valve 17 is then closed to seal the outlet pipe 15. Air, under pressure, is forced into the fluid compartment 29 for inflating the rubber cover 28 by moving it in a direction away from the bottom 30a of the fluid compartment 29 towards the roller 46. The expanding or moving rubber cover 28 engages the liquid adhesive 13 and raises its level above the roller 46, such that the roller 46 is completely submerged in adhesive. Thus, the inflatable bag 26 acts to displace the adhesive and vary its level within the dip tank 11.

After the coating process is completed, the bag 26 can either be deflated to lower the level of the adhesive within the dip tank 11, or the 3-way valve 17 can be opened to drain the dip tank 11 of adhesive. In this particular embodiment, the bag 26 must be inflated to completely drain the dip tank 11. The combination inlet and outlet pipe 15 may be placed in the bottom 27 of the dip tank 11, such that the tank could drain by gravity. However, it was found that a better seal between the rubber cover 28 and dip tank 11 could be achieved by placing the inflatable bag 26 in this particular position relative to the location of the combination inlet and outlet pipe 15 in the sidewall 42 above the bottom 27 of the dip tank 11. The fluid chamber 12 of the dip tank 11 can be coated with any suitable material for keeping the adhesive from sticking to the sidewalls of the dip tank 11.

Thus, there has been provided a unique assembly for varying the level of liquid in a tank, especially in relation to a roller fixedly disposed in the tank and used for directing fabric into dipping, coating relation with liquid in the tank. The level of the liquid is raised or lowered by inflating and deflating a bag, which is preferably secured adjacent the bottom of the tank and has at least one flexible side or diaphragm, which is movable in a direction to displace liquid towards the roller, thereby raising the level of the liquid in the tank relative to the roller. The material of the flexible bag or diaphragm, whichever the case, should be compatible with the ingredients of the adhesive, such that adhesive can be readily cleaned or removed from the material and no unfavorable chemical reactions will result from the intimate contact between the adhesive and material.

While certain representative embodiments and details have been shown for the purpose of illustrating the invention it will be apparent to those skilled in the art that various changes and modifications may be made therein without departing from the spirit or scope of the invention.

What is claimed is:

1. In combination:
  a. a tank for holding liquid, the tank having a bottom in spaced relation below an opening in the tank;
  b. an inflatable bag disposed along the bottom of the tank and maintaining any liquid in the tank in spaced relation from the bottom of the tank;
  c. means mounted in the tank for directing liquid coatable material into dipping relation with liquid in the tank when the bag is inflated, said means including a roller mounted in the tank for rotation about an axis which is in fixed relation to the tank, the roller journalled for rotation in bearings disposed outside the tank;
  d. means for inflating the bag with gas, under pressure, in the direction of the roller to displace and vary the level of liquid in the tank;
  e. means for sealing the bearings from liquid in the tank, and
  f. means centrally disposed of the bag for restraining the degree of ballooning of the bag in the direction of the roller.

2. The combination of claim 1, wherein the level of liquid in the tank is raised by inflating the bag.

3. The combination of claim 1, which includes:
  g. means for deflating the bag, when inflated, to lower the level of liquid in the tank.

4. The combination of claim 1, wherein the means for directing material into dipping relation with the liquid, includes a roller rotatable about an axis normal to the direction in which the material moves to and from the roller.

5. The combination of claim 1, wherein the bag is composed of elastomeric material.

6. The combination of claim 5, wherein the elastomeric material is rubber.

7. The combination of claim 1, which includes means for filling and draining liquid from the tank.

8. The combination of claim 1, wherein the bag comprises a fluid impervious compartment including a flexible diaphragm movable by gas, under pressure.

9. The combination of claim 8, wherein the diaphragm is composed of rubber.

10. In combination:
  a. a liquid impervious tank for holding liquid, the tank having a bottom in spaced relation below an opening in the tank;
  b. a gas impervious compartment disposed along the bottom of the tank for holding gas under pressure, the compartment including a flexible diaphragm sealing the compartment and maintaining any liquid in the tank in spaced relation from the bottom of the tank, the diaphragm movable by gas, under pressure, in a direction away from the compartment;
  c. means mounted in the tank for directing liquid coatable material into dipping relation with liquid in the tank when the bag is inflated, said means including a roller mounted in the tank for rotation about an axis which is in fixed relation to the tank, the roller journalled for rotation in bearings disposed outside the tank;
  d. means for forcing gas, under pressure, into the compartment to move the flexible diaphragm and expand the compartment in the direction of the roller only to displace liquid in the tank and, consequently, vary the level of liquid in the tank relative to the opening in the tank;
  e. means for sealing the bearings from liquid in the tank; and
  f. means centrally disposed of the diaphragm for restraining the degree of ballooning of the diaphragm in the direction of the roller.

11. The combination of claim 10, wherein means (f) includes:
  g. a plurality of inextensible staying members fastened between the diaphragm and opposing side of the compartment for maintaining the diaphragm in farther spaced relation from the opening in the tank than the roller, when gas, under pressure, is within the compartment.

12. The combination of claim 10, wherein the diaphragm is composed of elastomeric material.

13. The combination of claim 12, wherein sides of the compartment other than the diaphragm, are rigid.

14. The combination of claim 12, wherein the compartment is formed by gas impervious, flexible material.

15. The combination of claim 12, wherein the elastomeric material is rubber.

16. A dip tank in which fabric with tire cords for reinforcing pneumatic tires is coated with a liquid adhesive for increasing the bond between the fabric and rubber material used in the production of tires, comprising:
  a. a partially enclosed liquid impervious chamber for holding liquid adhesive the chamber having a bottom in spaced relation below an opening in the chamber;
  b. an enclosed gas impervious compartment disposed along the bottom of the liquid chamber and including a flexible diaphragm sealing the compartment and maintaining any liquid in the chamber in spaced relation from the bottom of the chamber, the diaphragm movable by gas, under pressure;
  c. means for forcing gas, under pressure, into the gas compartment to move the diaphragm and expand said compartment in a direction away from the bottom only to displace and raise the level of adhesive in the liquid chamber;
  d. means for exhausting gas from the gas compartment when expanded, to contract the gas compartment and lower the level of adhesive in the liquid chamber;

e. a shaft disposed in, and extending through opposing sides of the liquid chamber intermediate the gas compartment and opening in the liquid chamber, the shaft being rotatable about its longitudinal axis which is in fixed relation to the liquid chamber and normal to the direction which the fabric moves to and from the shaft;

f. a pair of bearings disposed outside the liquid chamber for rotatably receiving opposing ends of the shaft;

g. means for the sealing the bearings from liquid in the chamber;

h. a roller mounted on the shaft for unitary rotation about the longitudinal axis of the shaft, the roller designed to direct moving fabric into dipping coating relation with adhesive in the liquid chamber when the gas compartment is expanded;

i. means for draining adhesive from the liquid chamber; and j. means centrally disposed of the diaphragm for restraining the degree of ballooning of the diaphragm in the direction of the roller.

17. The dip tank of claim 16, wherein the flexible diaphragm is composed of elastomeric material.

18. The dip tank of claim 17, wherein the elastomeric material is rubber.

19. The dip tank of claim 16, wherein the gas impervious compartment is an inflatable rubber bag.

20. The dip tank of claim 16, wherein the means (j) includes a plurality of inextensible staying members fastened between the diaphragm and opposing side of the compartment.

* * * * *